US010859722B2

(12) United States Patent
Pires de Vasconcelos

(10) Patent No.: US 10,859,722 B2
(45) Date of Patent: Dec. 8, 2020

(54) METHODS FOR SEISMIC IMAGING

(71) Applicant: SCHLUMBERGER TECHNOLOGY CORPORATION, Sugar Land, TX (US)

(72) Inventor: Ivan Pires de Vasconcelos, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/694,713

(22) Filed: Sep. 1, 2017

(65) Prior Publication Data

US 2018/0180754 A1    Jun. 28, 2018

Related U.S. Application Data

(60) Provisional application No. 62/382,607, filed on Sep. 1, 2016.

(51) Int. Cl.
*G01V 1/30* (2006.01)
*G01V 1/28* (2006.01)
*G01V 1/36* (2006.01)

(52) U.S. Cl.
CPC ............... *G01V 1/301* (2013.01); *G01V 1/28* (2013.01); *G01V 1/282* (2013.01); *G01V 1/36* (2013.01);
(Continued)

(58) Field of Classification Search
CPC .......... G01V 1/28; G01V 1/282; G01V 1/301; G01V 1/36; G01V 2210/53; G01V 2210/56; G01V 2210/74; G01V 2210/614
See application file for complete search history.

(56) References Cited

U.S. PATENT DOCUMENTS

2013/0322208 A1* 12/2013 Sollner ................. G01V 1/325
367/24
2014/0200820 A1* 7/2014 El Yadari ............. G01V 1/364
702/17
(Continued)

FOREIGN PATENT DOCUMENTS

WO       2015082419 A1    6/2015

OTHER PUBLICATIONS

Broggini et al., "Data-driven Green's function retrieval and imaging with multidimensional deconvolution: numerical examples for reflection data with internal multiples," SEG Tech. Prog. Exp. Abs., 2013, pp. 4156-4161.
(Continued)

*Primary Examiner* — Bryan Bui

(57) ABSTRACT

The present disclosure relates to Target-Enclosing Extended Image deconvolution. In a first aspect, the present disclosure provides methods to construct, from surface seismic reflection data, extended image gathers, i.e. time- and space-varying fields corresponding to virtual sources and receivers inside a subsurface volume, to retrieve both local reflection and local transmission responses corresponding to two datums at depth: an original observation datum and a second datum completely enclosing a chosen target subsurface volume away from the original observation datum (e.g., enclosing a target reservoir at depth). The methods of the present disclosure retrieve responses that are devoid of interference due to structures that may exist both above and below the target volume, i.e., the retrieved responses correspond only to the properties of the medium within or inside of the target volume.

11 Claims, 12 Drawing Sheets

(52) U.S. Cl.
CPC ...... *G01V 2210/53* (2013.01); *G01V 2210/56* (2013.01); *G01V 2210/614* (2013.01); *G01V 2210/74* (2013.01)

(56) References Cited

U.S. PATENT DOCUMENTS

| | | | |
|---|---|---|---|
| 2015/0046093 A1* | 2/2015 | Pires De Vasconcelos | G01V 1/307 702/16 |
| 2015/0073755 A1 | 3/2015 | Tang et al. | |
| 2015/0109881 A1 | 4/2015 | Poole et al. | |
| 2016/0238729 A1 | 8/2016 | Warner et al. | |
| 2016/0313465 A1* | 10/2016 | Sollner | G01V 1/364 |

OTHER PUBLICATIONS

Broggini et al., "Focusing the wavefield inside an unknown 1d medium: Beyond seismic interferometry", Geophysics, 77, 5, Sep.-Oct. 2015, pp. A25-A28.

Slob et al., "Coupled Marchenko equations for electromagnetic Green's function retrieval and imaging", SEG Tech. Prog. Exp. Abs., 2013, pp. 1863-1867.

Van Der Neut, J. et al., "Interferometric redatuming of autofocussed primaries and internal multiples", SEG Tech. Prog. Exp. Abs., 2013, pp. 4589-4594.

Vasconcelos et al., "Full-wavefield Redatuming of Perturbed Fields with the Marchenko Method", 78th EAGE Conference and Exhibition, May 31, 2016, 5 pages.

Vasconcelos et al., "Using inverse transmission matrices for Marchenko redatuming in highly complex media", SEG New Orleans Annual Meeting, 2015, 6 pages.

Wapenaar, K., et al., "Three-dimensional Marchenko equation for Green's function retrieval beyond seismic nterferometry", SEG Techical Program Expanded Abstracts, 2013, pp. 4573-4578.

Wapenaar, K., et al., "Three-Dimensional Single-Sided Marchenko Inverse Scattering, Data-Driven Focusing, Green's Function Retrieval, and their Mutual Relations", Physical Review Letters, 2013, 110(8), 084301.

Weibull, W., "Seismic Processing and Velocity Analysis Using Reverse-Time Migration", Thesis Norweigian University of Science and Technology, 2013, 114 pages.

Broggini, Wave field autofocusing and application to multidimensional deconvolution and imaging with internal multiples, Retrieved from the Internet: URL:http://ddod.riss.kriddodservice/search/viewDetailThesisInfoForm.ispp_no=13298926 p_abstract_yn=Y p_toc_yn=N p_fulltext_kind=002 p_search=p_k2dockey, Thieses, Colorodo School of Mines, Jan. 1, 2013, 151 pages.

Search and Exam Report R 62 EPC issued in European Patent Application No. 17847607.3 dated Mar. 26, 2020, 8 pages.

* cited by examiner $$\underbrace{\begin{bmatrix} \mathbf{P}_{top}^- & [\mathbf{P}_{top}^+]^* \\ \mathbf{P}_{bot}^+ & [\mathbf{P}_{bot}^-]^* \end{bmatrix}}_{\mathbf{F}_{out}} = \underbrace{\begin{bmatrix} \mathbf{R}_{TE}^+ & \mathbf{T}_{TE}^- \\ \mathbf{T}_{TE}^+ & \mathbf{R}_{TE}^- \end{bmatrix}}_{\mathbf{M}_{TE}} \underbrace{\begin{bmatrix} \mathbf{P}_{top}^+ & [\mathbf{P}_{top}^-]^* \\ \mathbf{P}_{bot}^- & [\mathbf{P}_{bot}^+]^* \end{bmatrix}}_{\mathbf{F}_{in}} \quad \text{Eq. 1}$$

FIG. 11

Decomposing the input fields:

$$\begin{aligned} \mathbf{F}_{in} &= \mathbf{F}_{in,0} + \mathbf{F}_{in,m} \\ &= \mathbf{F}_{in,0}(\mathbf{I} + \mathbf{F}_{in,0}^{\ddagger}\mathbf{F}_{in,m}) \end{aligned} \quad \text{Eq. 2}$$

with $$\underbrace{\mathbf{F}_{in,0} = \begin{bmatrix} \mathbf{P}_{top,0}^+ & \mathbf{0} \\ \mathbf{0} & [\mathbf{P}_{bot,0}^+]^* \end{bmatrix}}_{\text{Model driven}} \quad \underbrace{\mathbf{F}_{in,m} = \begin{bmatrix} \mathbf{P}_{top,m}^+ & [\mathbf{P}_{top}^-]^* \\ \mathbf{P}_{bot}^- & [\mathbf{P}_{bot,m}^+]^* \end{bmatrix}}_{\text{Marchenko fields}} \quad \text{Eq. 3}$$

FIG. 12

TEEI response, to Nth-order in the Marchenko fields

$$\mathbf{M}_{TE}^{(N)} = \mathbf{F}_{out}\mathbf{F}_{in,0}^{\ddagger}\left[\mathbf{I} + \left(\sum_{n=1}^{N} -\mathbf{F}_{in,0}^{\ddagger}\mathbf{F}_{in,m}\right)^{n}\right] \qquad \text{Eq. 4}$$

$$\mathbf{R}_{TE}^{+(1)} = \overbrace{\mathbf{P}_{top}^{-}(\mathbf{P}_{top,0}^{+})^{\ddagger}}^{\text{Leading order}} \overbrace{\left[\mathbf{I} - (\mathbf{P}_{top,0}^{+})^{\ddagger}\mathbf{P}_{top,m}^{+}\right]}^{\text{Overburden}}$$
$$- \underbrace{\mathbf{P}_{top}^{+*}[(\mathbf{P}_{bot,0}^{+})^{2}]^{\ddagger}\mathbf{P}_{bot,0}^{-}}_{\text{Underburden}} \qquad \text{Eq. 5}$$

or $$\mathbf{T}_{TE}^{+(1)} = \overbrace{\mathbf{P}_{bot}^{+}(\mathbf{P}_{top,0}^{+})^{\ddagger}}^{\text{Leading order}} \overbrace{\left[\mathbf{I} - (\mathbf{P}_{top,0}^{+})^{\ddagger}\mathbf{P}_{top,m}^{+}\right]}^{\text{Overburden}}$$
$$- \underbrace{\mathbf{P}_{bot}^{-*}[(\mathbf{P}_{bot,0}^{+})^{2}]^{\ddagger}\mathbf{P}_{bot,0}^{-}}_{\text{Underburden}} \qquad \text{Eq. 6}$$

*FIG. 13*

Transposed normal equations, PSF/blurring system $$\mathbf{F}_{in}^{*}\mathbf{F}_{in}^{T}\mathbf{M}_{TE}^{T} = \mathbf{F}_{in}^{*}\mathbf{F}_{out}^{T} \qquad \text{Eq. 7}$$

$$\mathbf{B}_{in}\mathbf{M}_{TE}^{T} = \mathbf{G}_{out} \qquad \text{Eq. 8}$$

*FIG. 14*

Decomposition of the PSF/blurring operator $$\mathbf{B}_{in} = \mathbf{B}_{in,0} + \mathbf{B}_{in,m} \quad \text{Eq. 9}$$

$$= \mathbf{B}_{in,0}\left(\mathbf{I} + \mathbf{B}_{in,0}^{\dagger}\mathbf{B}_{in,m}\right)$$

$$\left[\mathbf{M}_{TE}^{(N)}\right]^{T} = \overbrace{\mathbf{B}_{in,0}^{\dagger}\mathbf{F}_{out}^{T}}^{\text{Leading order}}$$

$$\left.\begin{array}{l}\text{Overburden}\\+\\\text{Underburden}\end{array}\right\{ \begin{array}{l} + \mathbf{B}_{in,0}^{\dagger}\left(\sum_{n=1}^{N}-\mathbf{B}_{in,0}^{\dagger}\mathbf{B}_{in,m}\right)^{n}\left[\mathbf{F}_{in,0}^{*}\mathbf{F}_{out}^{T}\right] \\ + \mathbf{B}_{in,0}^{\dagger}\left(\sum_{n=1}^{N}-\mathbf{B}_{in,0}^{\dagger}\mathbf{B}_{in,m}\right)^{n}\left[\mathbf{F}_{in,m}^{*}\mathbf{F}_{out}^{T}\right] \end{array} \quad \text{Eq. 10}$$

*FIG. 15*

METHODS FOR SEISMIC IMAGING

CROSS-REFERENCE TO RELATED APPLICATION

This application claims the benefit of U.S. Provisional Application No. 62/382,607, filed Sep. 1, 2016.

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

The present disclosure relates to computer imaging for simulation of physical objects and their interactions. In particular, but not by way of limitation, this disclosure relates to generating Target-Enclosing Extended Image (TEEI) gathers. Reflectivity gathers such as TEEI gathers can be extracted at depth by means of multidimensional deconvolution (MDD). However, local reflectivity inversion by MDD can only retrieve reflection responses at one target datum and, as such, cannot isolate the response of a target volume. For example, while reflectivity inversion may remove interference of overburden structures, interference due to underburden structures may remain.

BRIEF SUMMARY

The present disclosure relates to TEEI deconvolution. In a first aspect, the present disclosure provides methods to construct, from surface seismic reflection data, extended image gathers, i.e. time- and space-varying fields corresponding to virtual sources and receivers inside a subsurface volume, to retrieve both local reflection and local transmission responses corresponding to two datums at depth: an original observation datum and a second datum completely enclosing a chosen target subsurface volume away from the original observation datum (e.g., enclosing a target reservoir at depth). The methods of the present disclosure retrieve responses that are devoid of interference due to structures that may exist both above and below the target volume, i.e., the retrieved responses correspond only to the properties of the medium within or inside of the target volume.

By way of non-limiting example only, methods of the present disclosure may include starting with surface reflection data (e.g., surface streamer seismic data, ocean-bottom seismic data, or the like, where the data can be single- or multi-component data) and
  (1) retrieving the up- and down-going fields at two chosen target depth levels by means of redatuming, the redatuming being accomplished by any approach/method capable of retrieving full-waveform responses at depth, decomposed into up- and down-going components (for example the method of Marchenko redatuming fulfills these criteria);
  (2) using the fields from item (1) to construct an appropriate TEEI system (see for example Equation 1 of FIG. 11 for a field-based TEEI system or Equations 7-8 of FIG. 14 for a blurring/Point Spreading Function (PSF)-based TEEI system); and
  (3) performing MDD to retrieve the TEEIs from the input fields from item (2), i.e., numerically solving for the block matrix MTE (see, e.g., Equation 1 of FIG. 11) that describes the TEEIs.

Retrieval of the TEEIs as described herein overcomes the above limitations of reflectivity-only inversion. Methods of the present disclosure retrieve not only reflection but also transmission responses corresponding to two datums at depth, completely enclosing a target volume e.g. subsurface reservoir, and the retrieved responses are devoid of interference due to structures placed both above and below the target volume.

BRIEF DESCRIPTION OF THE DRAWINGS

For a detailed description of embodiments of the present disclosure, reference will now be made to the accompanying drawings in which:

FIG. 11 shows an equation for constructing a field-based TEEI system according to an embodiment of the present disclosure;

FIG. 12 show equations for applying a field-based decomposition in a TEEI system, according to an embodiment of the present disclosure;

FIG. 13 shows equations for estimating the TEEI to a desired order N using a field based-expansion solution, according to an embodiment of the present disclosure;

FIG. 14 shows equations for constructing a blurring/Point Spreading Function (PSF)-based TEEI system according to an embodiment of the present disclosure; and FIG. 15 shows equations for applying a PSF/blurring-based decomposition in a TEEI system, according to an embodiment of the present disclosure.

DETAILED DESCRIPTION

Figure 1A:
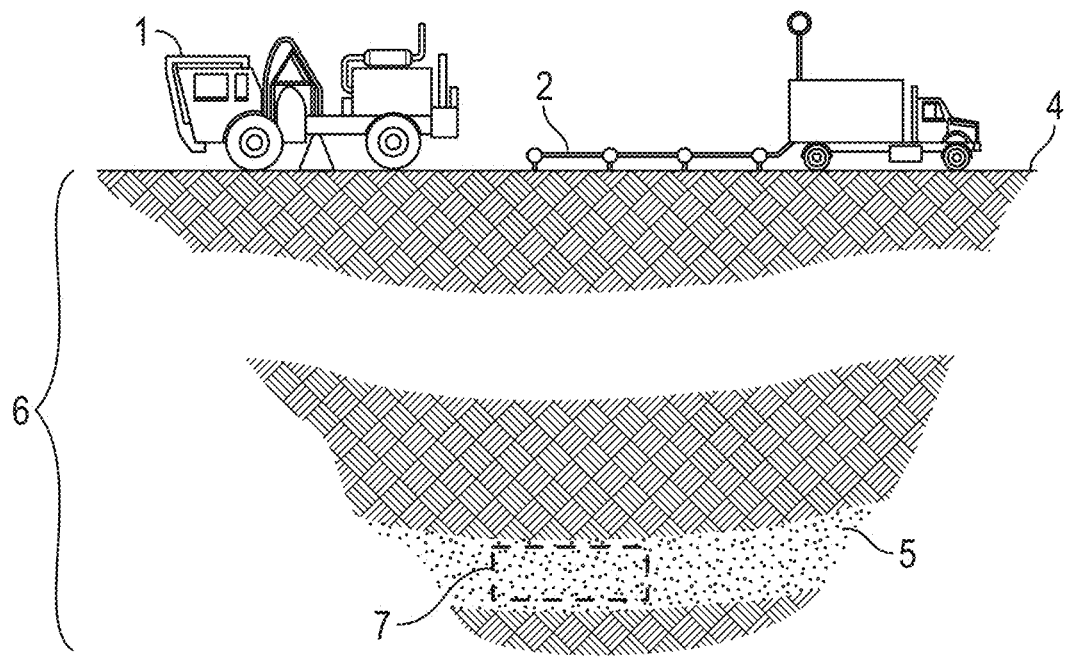
FIGS. 1A and 1B schematically show seismic systems with which one or more embodiments of the present disclosure can be employed.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

This discussion is directed to various embodiments of the disclosure. The drawing figures are not necessarily to scale. Certain features of the embodiments may be shown exaggerated in scale or in somewhat schematic form, and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application and that the discussion of any embodiment is meant only to be exemplary of that embodiment, and not intended to intimate that the scope of the disclosure, including the claims, is limited to that embodiment.

The terminology used in the description of the disclosure herein is for the purpose of describing particular embodiments only and is not intended to be limiting of the subject matter. When introducing elements of various embodiments of the present disclosure and claims, the articles "a," "an," "the," and "said" are intended to mean that there are one or more of the elements. The term "and/or" as used herein refers to and encompasses any and all possible combinations of one or more of the associated listed items. The terms "comprising," "including," and "having" are used in an open-ended fashion, and thus should be interpreted to mean "including, but not limited to . . . ."

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Figure 1B:
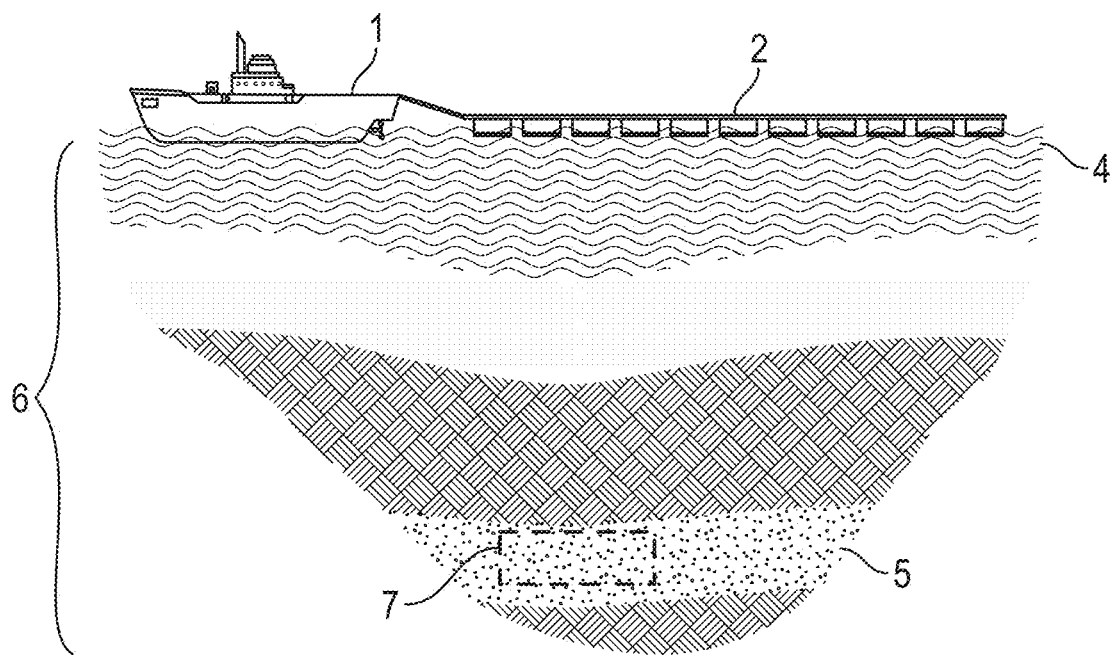

Referring now to the drawings, FIGS. 1A and 1B schematically illustrate seismic systems with which one or more embodiments of the present disclosure can be employed. The seismic systems are used to perform seismic surveys of Earth formations and subsurface reservoirs. Seismic surveys may be obtained by processing reflected seismic waves (not shown) generated by subsurface seismic reflectors, such as, for example, the top and the bottom of a target reservoir within a formation 4. The reflected seismic waves are typically generated by a seismic acoustic source 1 located at the surface, either on land, as generally and schematically shown in FIG. 1A, or offshore, as generally and schematically shown in FIG. 1B, and received by a receiver or receiver array 2. When a seismic wave encounters a boundary between two materials having different impedances, a portion of the seismic wave is reflected and a portion of the seismic wave is transmitted through the boundary.

The present disclosure is directed toward using data corresponding to reflected seismic waves at a surface (e.g., the Earth's surface) 4. The methods of the present disclosure generate the so-called Target-Enclosing Extended Image (TEEI) gathers: these are "virtual data" corresponding to waves that are reflected and transmitted only through a target subvolume 7 (e.g., a target reservoir in a formation of interest 5 in the Earth's interior), as if the target subvolume 7 were completely enclosed by virtual sources and receivers placed both above and below it. While the original surface data contains information related to the entire volume 6 beneath the acquisition surface, the TEEIs of the present disclosure retrieve information that pertains only to a target subvolume 7 with no interference from waves related to structures that lie outside of it.

The methodology of the present disclosure retrieves the TEEIs in two steps: (1) extrapolation or redatuming, and (2) TEEI deconvolution. In the extrapolation or redatuming step, the observed surface reflected seismic waves are recast as if they were recorded inside the medium, though still excited by the original source on the surface. An essential feature of the redatuming step is that it must be able to account for the effects of multiple scattering to enable the retrieval of the TEEIs. In embodiments, this step may comprise so-called "Marchenko redatuming" or "Autofocusing."

In the TEEI deconvolution step, after extrapolation or redatuming, the resulting wave fields at depth are combined into a TEEI block system (see Equation 1 of FIG. 11), from which the TEEIs are obtained by Multi-Dimensional Deconvolution (MDD). As will be described, the present disclosure presents two embodiments of the MDD solution that yield stable deconvolution solutions and thus stable TEEIs. Equations referred to in the present disclosure are shown in FIGS. 11 to 15.

Figure 2:
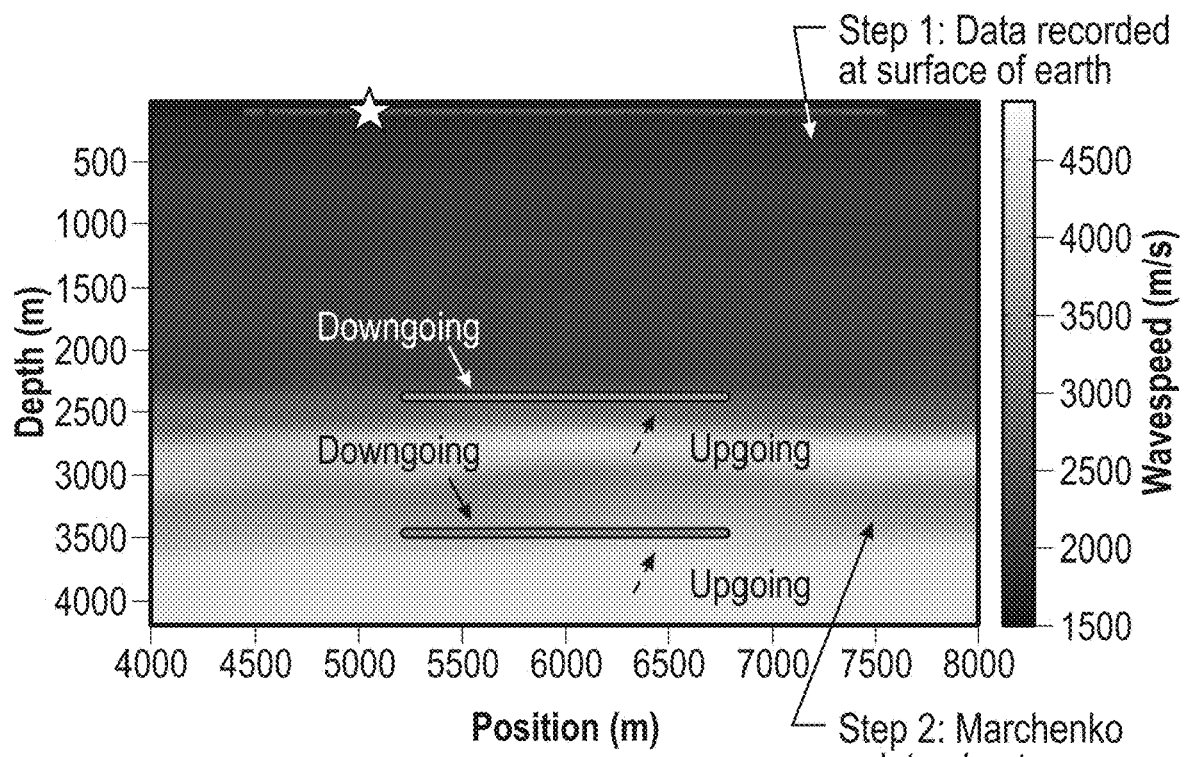
FIG. 2 shows steps 1 and 2 in accordance with one or more embodiments of the present disclosure.
Figure 3:
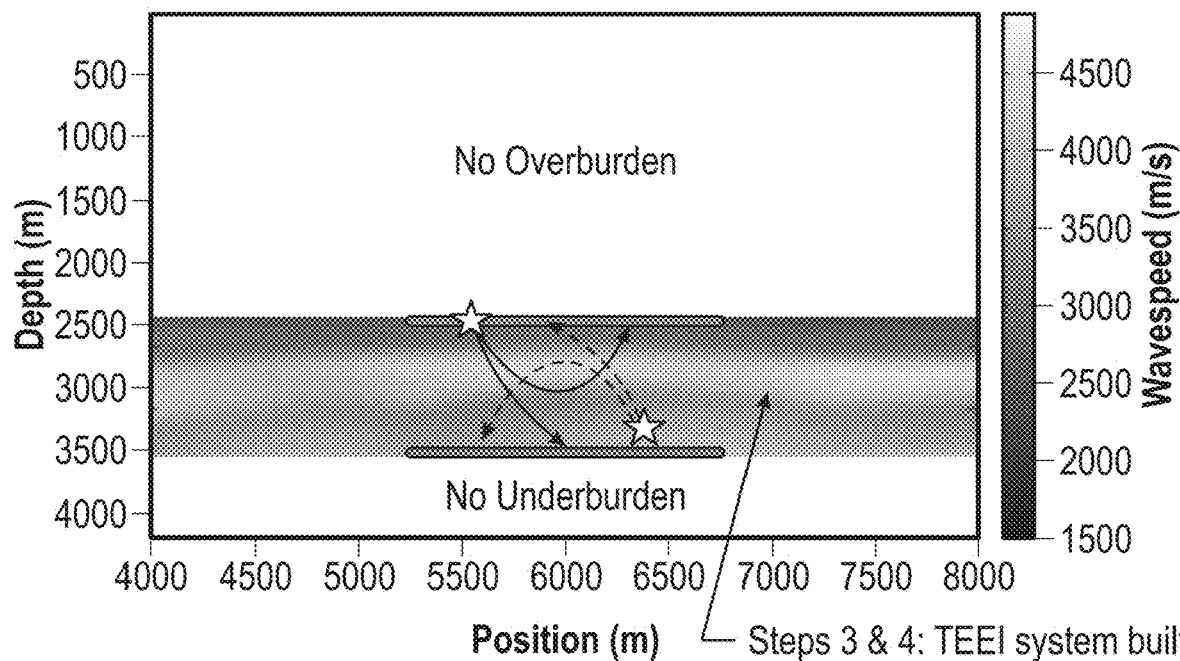
FIG. 3 shows steps 3 and 4 in accordance with one or more embodiments of the present disclosure.

Referring now to FIGS. 2 and 3, example steps of methods of the present disclosure (from original data to end result) are shown. More particularly, FIG. 2 schematically depicts example steps 1 and 2 in accordance with one or more embodiments of the present disclosure:

(1) starting with surface reflection data (e.g., surface streamer seismic data, ocean-bottom seismic data, or the like, where the data can be single- or multi-component data); and (2) retrieving the up- and down-going fields at two chosen target depth levels by redatuming, which can be done by any approach/method, so long as it retrieves full-waveform responses at depth, decomposed into up- and down-going components (for example the method of Marchenko redatuming is one embodiment that fulfills these criteria).

Referring now to FIGS. 2 and 3, example steps of methods of the present disclosure (from original data to end result) are shown. More particularly, FIG. 2 schematically depicts example steps 1 and 2 in accordance with one or more embodiments of the present disclosure:

(1) starting with surface reflection data (e.g., surface streamer seismic data, ocean-bottom seismic data, or the like, where the data can be single- or multi-component data); and (2) retrieving the up- and down-going fields at two chosen target depth levels by redatuming, which can be done by any approach/method, so long as it retrieves full-waveform responses at depth, decomposed into up- and down-going components (for example, the method of Marchenko redatuming is one embodiment that fulfills these criteria).

FIG. 3 schematically depicts example steps 3 and 4 in accordance with one or more embodiments of the present disclosure:

(3) using the fields from step (2) to construct an appropriate TEEI system (see for example Equation 1 of FIG. 11 for a field-based TEEI system or Equations 7-8 of FIG. 14 for a blurring/Point Spreading Function (PSF)-based TEEI system); and (4) performing MDD to retrieve the TEEIs from the input fields from step (3), i.e., numerically solving for the block matrix MTE that describes the TEEIs.

In embodiments, step (4) may be done in sub-steps, for example:

(i) applying an appropriate decomposition given the choice of TEEI system: i.e., either a field-based decomposition (see Equations 2-3 of FIG. 12), or a PSF/blurring-based decomposition (see Equation 9 of FIG. 15), noting that matrices [Fin,0] and [Bin,0=(Fin,0)*(Fin,0)T] may be calculated by forward modelling using known model parameters (e.g., a migration-velocity model), while [Fin] and [Bin=(Fin)*(Fin)T] use the total up- and down-going fields resulting from the redatuming step (e.g. Marchenko redatuming);

(ii) depending on the type of TEEI/solution chosen, estimating the inverse operator of either [Fin,0] or [Bin,0] (denoted with double-dagger superscript in Equations 4 and 10 of FIGS. 13 and 15) by means of any suitable numerical approach, e.g., direct regularized least-squares inverse, iterative gradient-based optimization, sparsity-promoting L1 minimization, or the like; and (iii) using the matrices from the previous two sub-steps (i) and (ii), calculating the estimate of the TEEI, MTE, to a desired order N, using either the field-based expansion solution (see Equation 4 of FIG. 13) or the PSF/blurring-based expansion solution (see Equation 10 of FIG. 15).

To implement the methods of the present disclosure, a variety of hardware and software may be used. For example, in various embodiments, methods may employ hardware and software to acquire and pre-process the reflection data, e.g., in the case of ocean-bottom seismic, ocean-bottom sensors, source vessels, and the computational and manpower resources to acquire and process the seismic data. Alternatively, such data, e.g., ocean-bottom seismic data in suitable digital format, could be sourced from a third party with the resources to acquire and process the data. Together with the data, a corresponding parameter model suitable for "conventional imaging," e.g. in the case of seismic an industry-standard migration-velocity model, would be required.

In embodiments, to implement methods of the present disclosure, software in the form of a scripting or programming language with dedicated linear algebra libraries (e.g. C++, JavaScript, Python, MATLAB, or the like) may be used. Additionally or alternatively, specialized software that can execute/perform the redatuming step to the standard required may be used. For example, such specialized software may comprise a set of dedicated computer routines (e.g. written in an example language above) that can take the output data from hardware and/or software used to acquire and pre-process the reflection data and output the input fields by redatuming (e.g. Marchenko redatuming).

Embodiments of the presently disclosed methods have been tested in entirety, i.e., starting from surface reflection data, up- and down-going fields were retrieved at two target depth levels by means of Marchenko redatuming, these fields were used as input to construct an appropriate TEEI system and to perform MDD to retrieve the TEEIs. This was done using numerical 1D examples as well as field data, verifying that the method achieves the intended results in a practical and stable fashion. Results are provided in FIGS. 4-10.

Figure 4:
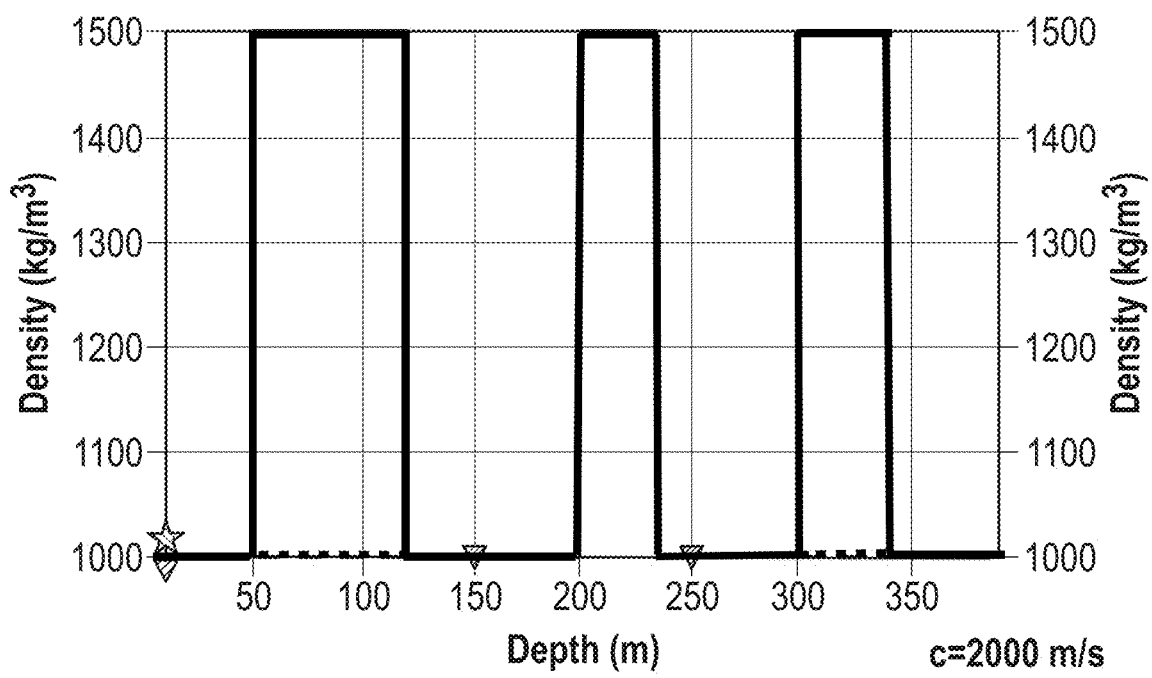
FIG. 4 shows the constant-wavespeed, variable-density model used in the numerical example of 1D implementation of one or more embodiments of the present disclosure.

FIG. 4 shows results from the constant-wavespeed, variable-density model used in the 1D numerical example. The solid line corresponds to the "true" model, where the desired target layer is indicated by the dashed line. The star and triangle on the left of the graph indicate the location of the zero-offset reflection data, while the triangles at about 150 m and 250 m depth indicate the datum points for redatuming and for which the TEEI have been extracted. In the example shown, the medium wavespeed is 2000 m/s.

Figure 5:
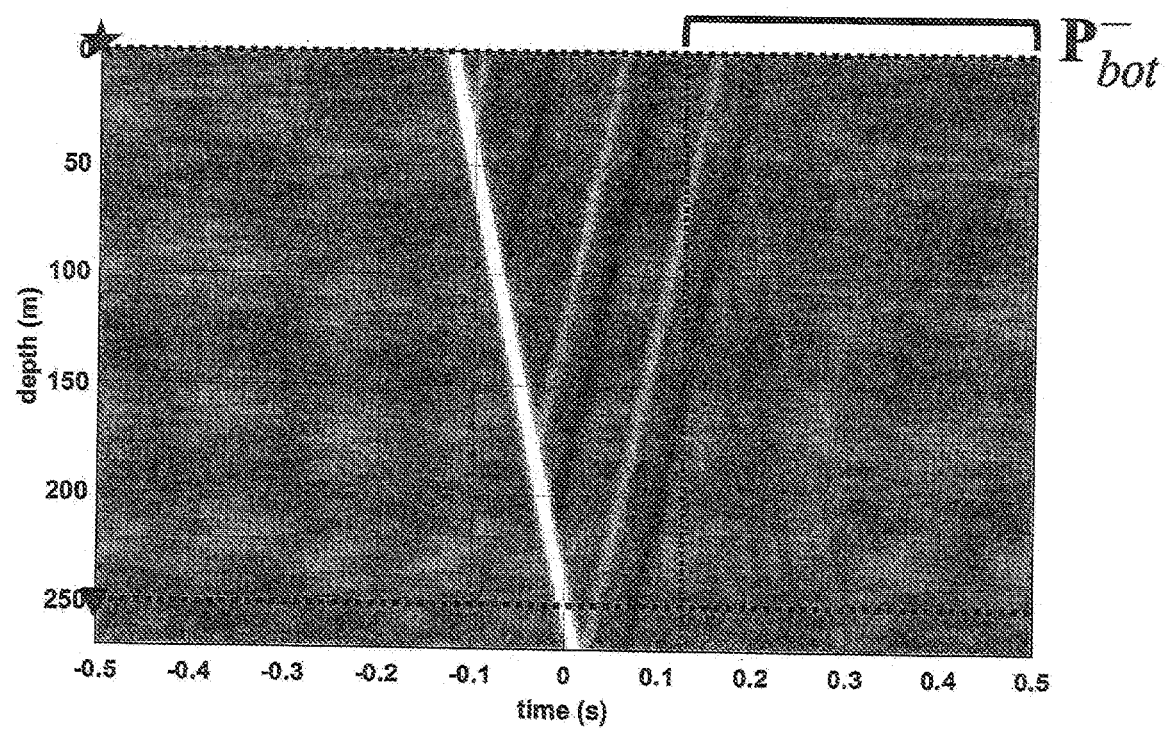
FIG. 5 shows Marchenko redatuming up-going results in the example of 1D implementation of one or more embodiments of the present disclosure.
Figure 6:
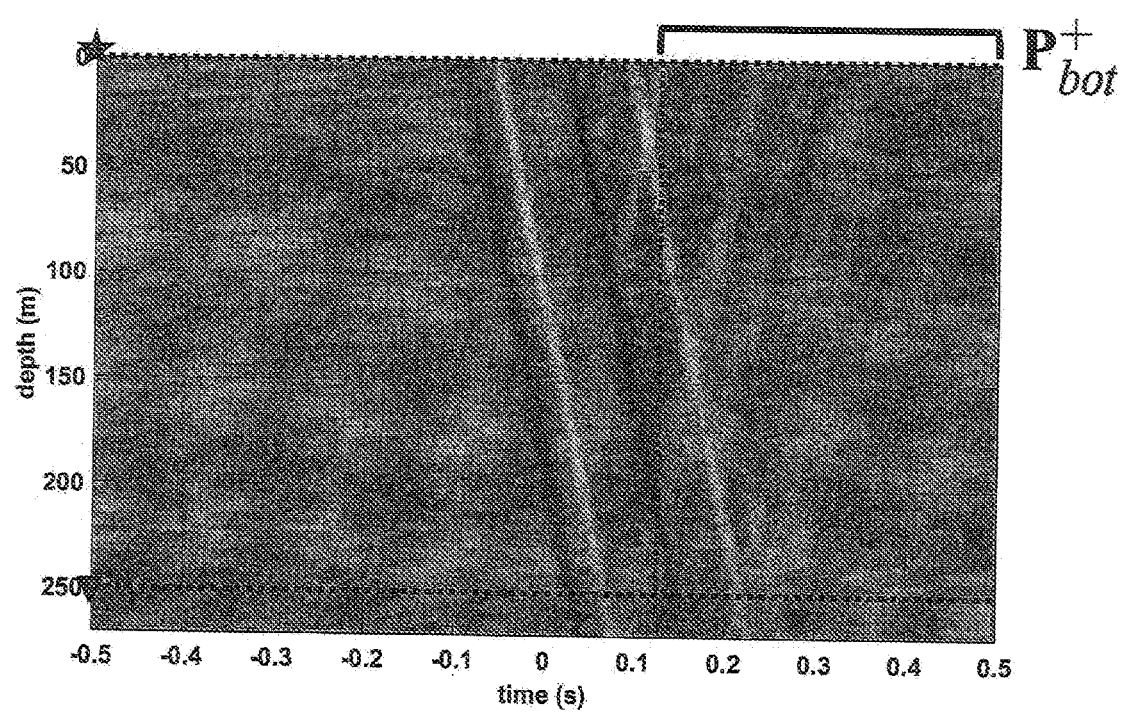
FIG. 6 shows Marchenko redatuming down-going results in the example of 1D implementation of one or more embodiments of the present disclosure.

FIG. 5 shows Marchenko redatuming up-going results, and FIG. 6 shows Marchenko redatuming down-going results from the 1D numerical example.

Figure 7:
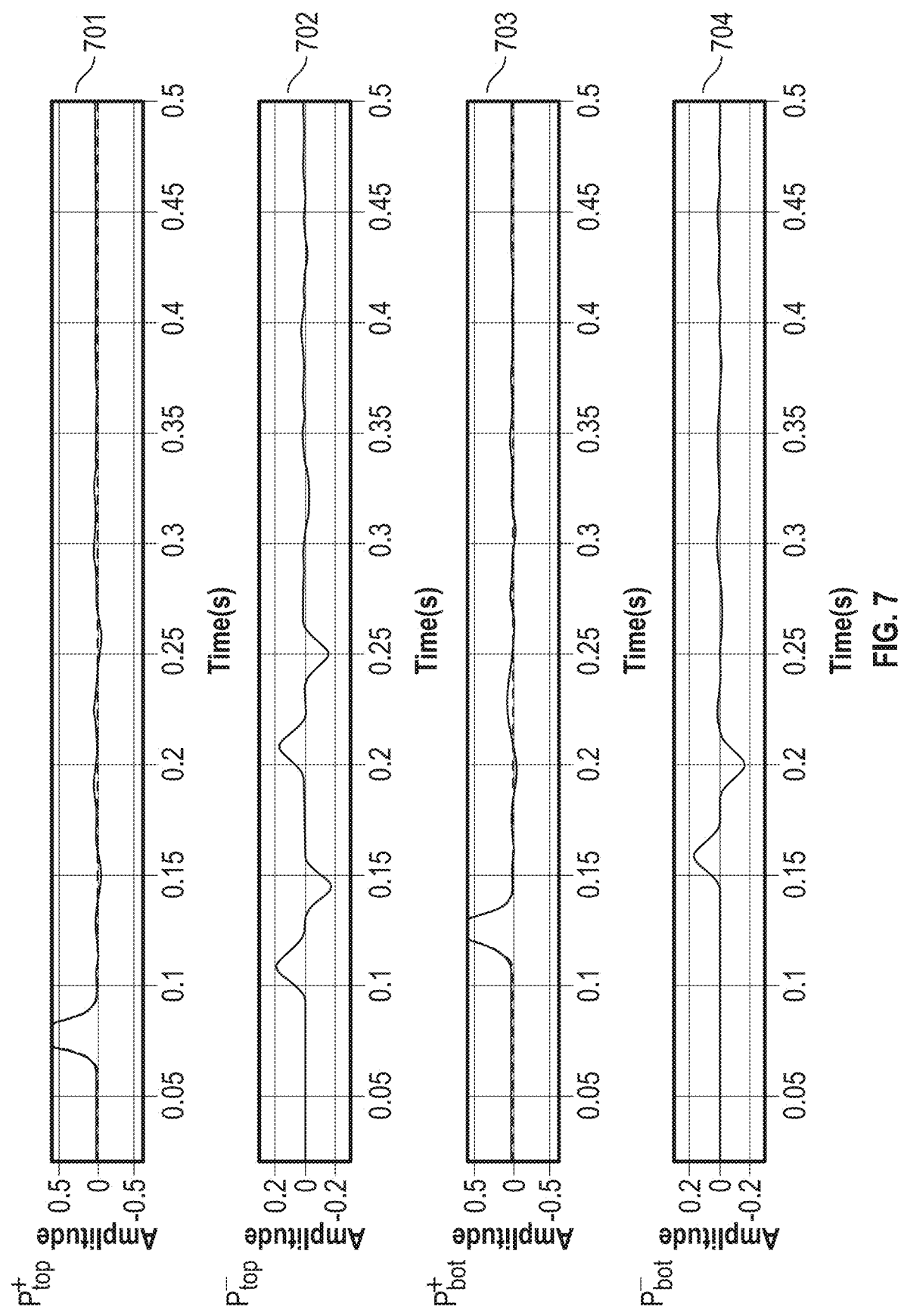
FIG. 7 shows wavefields at depth after Marchenko redatuming in the example of 1D implementation of one or more embodiments of the present disclosure.

FIG. 7 shows wavefields at depth after Marchenko redatuming corresponding to the triangles at about 150 m and 250 m depth in FIG. 4. The retrieved down- and up-going wavefields at the top triangle (i.e., at 150 m) are shown by the solid lines in the top two panels 701 and 702. Similarly, the retrieved down- and up-going wavefields at the bottom triangle (i.e., at 250 m) are shown by the solid lines in the bottom two panels 703 and 704. The dotted lines in panels 701 and 703 are the fields used in Fin,0, as required in Equation 2 of FIG. 12, for example.

Figure 8:
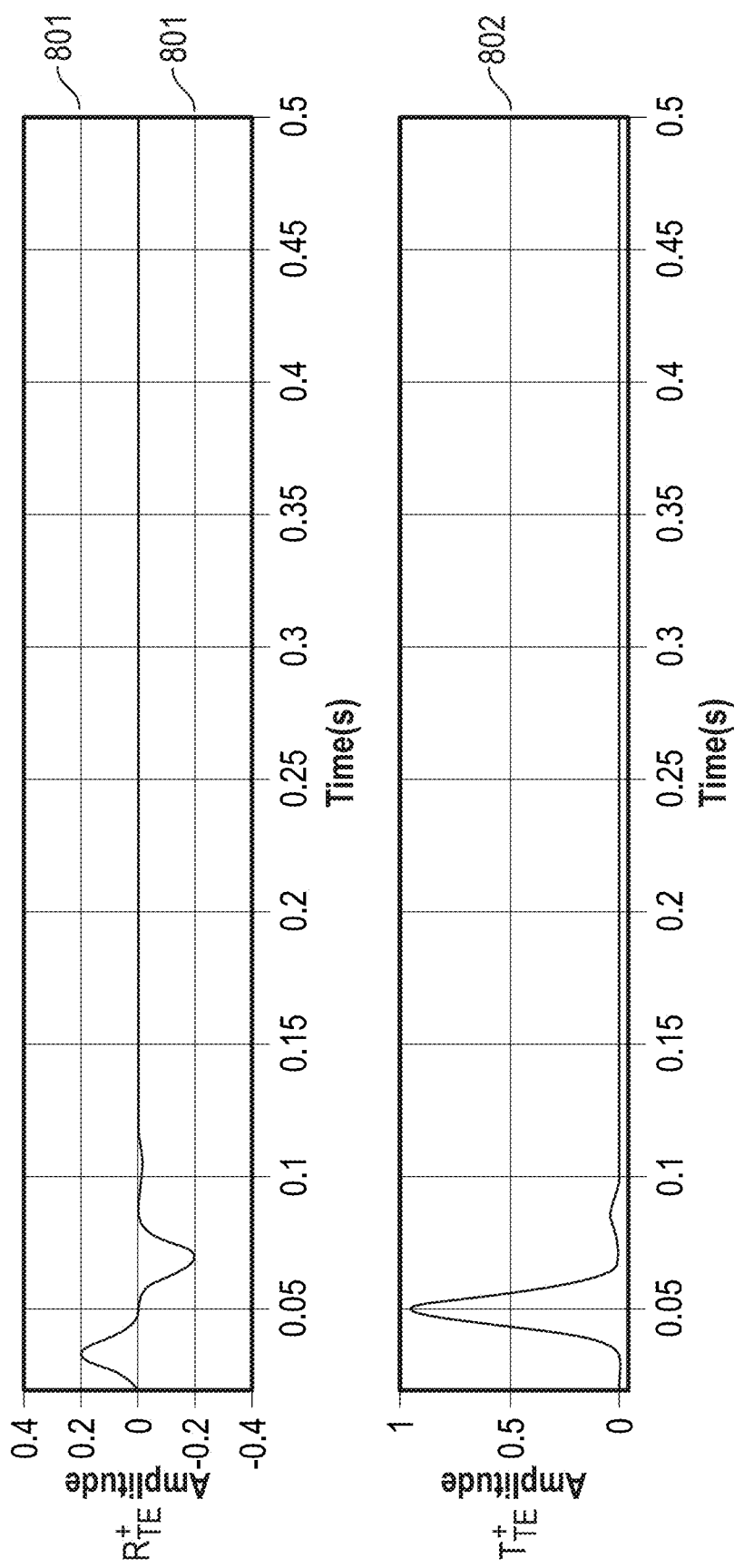
FIG. 8 shows true reflection and true transmission responses of the target layer in the example of 1D implementation of one or more embodiments of the present disclosure.

FIG. 8 shows true reflection (panel 801) and true transmission (panel 802) responses of the target layer (dotted line) in FIG. 4, for a source at the triangle placed at 150 m and a receiver placed at the other triangle at 250 m depth.

Figure 9:
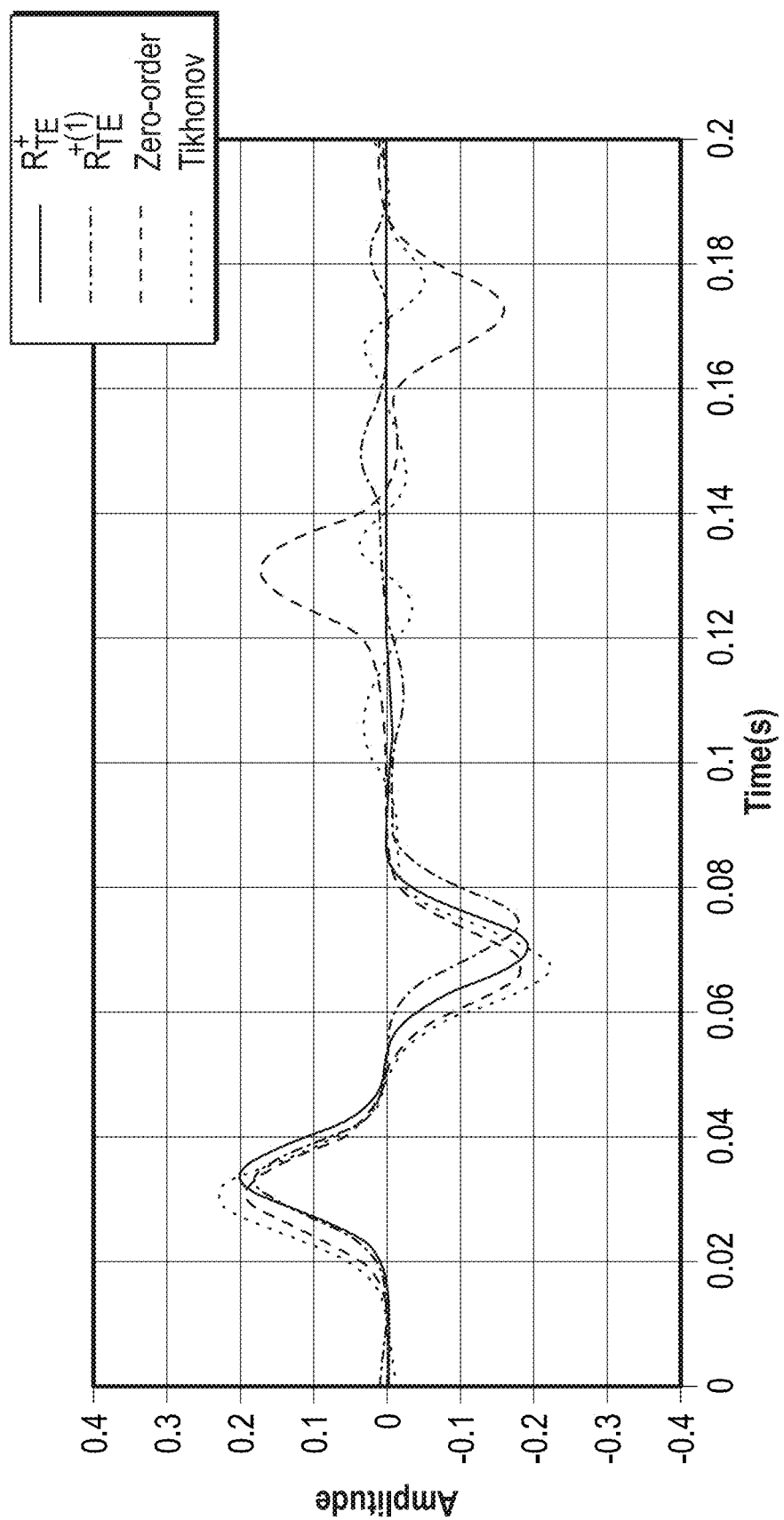
FIG. 9 shows target reflection responses in the example of 1D implementation of one or more embodiments of the present disclosure.

FIG. 9 shows target reflection responses estimated by TEEI inversion in the example of 1D implementation, benchmarked against the true responses here shown in black (from FIG. 8). The green lines correspond to a Tikhonov-regularized least-squares inversion of the full TEEI system. The red lines correspond to the PSF-based expansion, with N=1, while the blue lines represent the corresponding zero-order (N=0) terms of the same TEEI expansion. In this embodiment, the PSF-based TEEI responses are obtained without any regularization.

Figure 10:
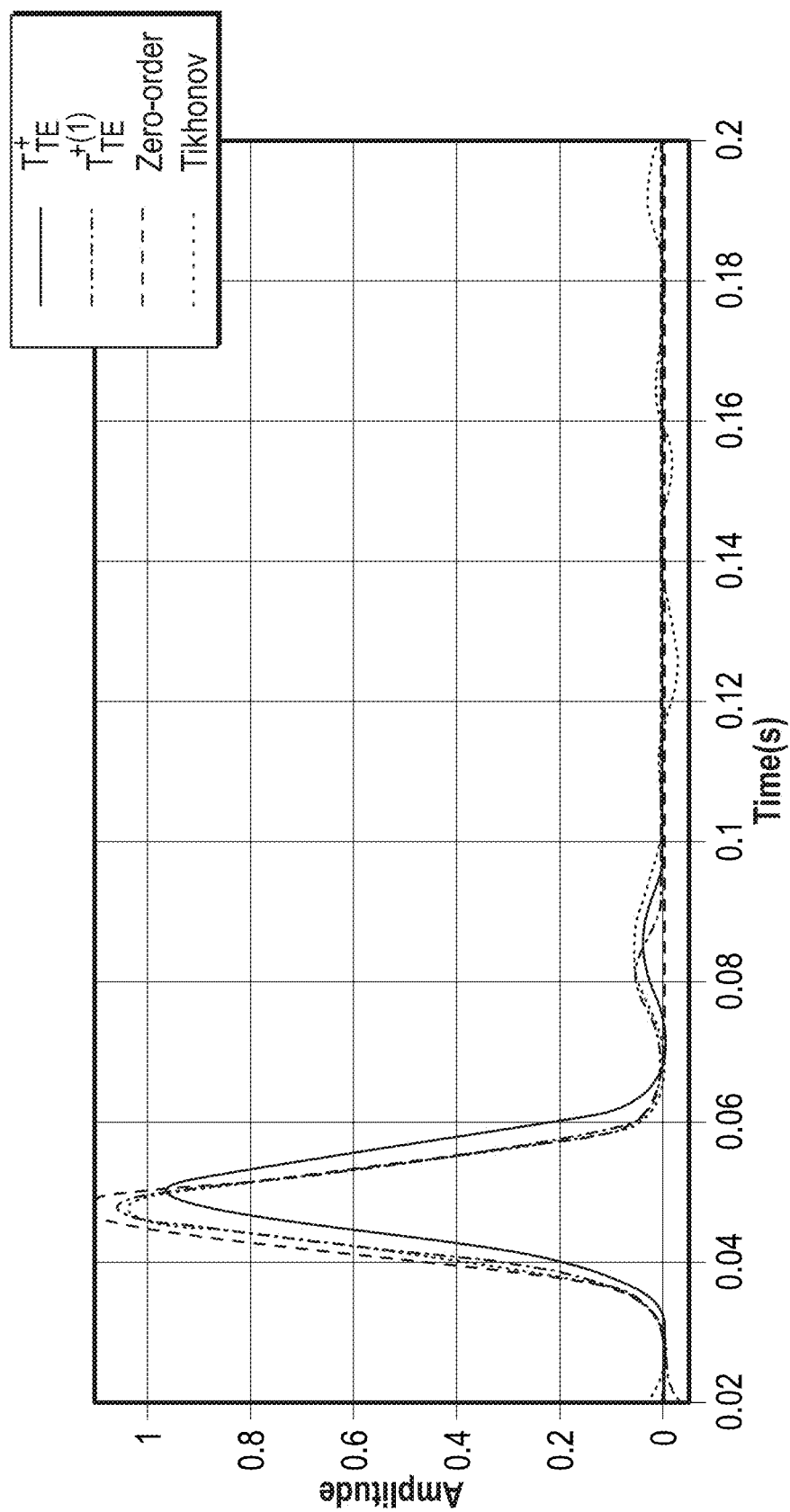
FIG. 10 shows target transmission responses in the example of 1D implementation of one or more embodiments of the present disclosure.

FIG. 10 shows target transmission responses estimated by TEEI inversion in the example of 1D implementation, benchmarked against the true responses here shown in black (from FIG. 8). The green lines correspond to a Tikhonov-regularized least-squares inversion of the full TEEI system. The red lines correspond to the PSF-based expansion, with N=1, while the blue lines represent the corresponding zero-order (N=0) terms of the same TEEI expansion. In this embodiment, the PSF-based TEEI responses are obtained without any regularization.

While the methods of the present disclosure have been described in the context of seismic imaging, the methods of the present disclosure also may be used in any industry that relies on back-scattered waves for imaging purposes. This includes medical imaging, engineering, or defense industries as examples. Applications may be for example ultrasound imaging for medical or engineering purposes, radar imaging, or sonar imaging.

Machine-readable instructions of steps described above may be loaded for execution on a processor. A processor can include a microprocessor, microcontroller, processor module or subsystem, programmable integrated circuit, programmable gate array, graphics processing unit, or another control or computing device, for example.

Data and instructions may be stored in respective storage devices implemented as one or multiple computer-readable or machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

The foregoing outlines features of several embodiments and sets forth numerous details so that those skilled in the art may better understand the aspects of the present disclosure. Those skilled in the art should appreciate that the present disclosure may provide a basis for designing or modifying other processes and structures for carrying out the same purposes and/or achieving the same advantages of the embodiments introduced herein.

Although the present disclosure has been described with respect to specific details, it is not intended that such details should be regarded as limitations on the scope of the invention, except to the extent that they are included in the accompanying claims.

What is claimed is:

1. A method to generate a seismic image of a subsurface volume of interest through constructing extended image gathers from surface seismic reflection data, the method comprising:
   retrieving from the surface seismic reflection data up-going and down-going fields at a first target depth level and at a second target depth level by redatuming, wherein the up-going and down-going fields are reflection and transmission responses at the first and second target depth levels and wherein the first and second target depth levels enclose the subsurface volume of interest;
   using the up-going and down-going fields as input fields to construct a Target-Enclosing Extended Image (TEEI) system comprising TEEI gathers, wherein the TEEI gathers correspond to virtual sources and receivers for retrieving local reflection and local transmission responses at the first and second target depth levels;
   performing multidimensional deconvolution to retrieve the TEEIs from the input fields; and
   generating the seismic image of the subsurface volume of interest.

2. The method of claim 1 wherein the Target-Enclosing Extended Image (TEEI) system is a field-based TEEI system.

3. The method of claim 1 wherein the Target-Enclosing Extended Image (TEEI) system is a blurring/Point Spreading Function-based TEEI system.

4. The method of claim 1 wherein the performing multidimensional deconvolution comprises numerically solving for a block matrix MTE that describes the TEEIs.

5. The method of claim 4, wherein the numerically solving for a block matrix MTE that describes the TEEIs comprises:
   (i) selecting and applying a field-based decomposition or a Point Spreading Function/blurring-based decomposition;
   (ii) estimating an inverse operator corresponding to the selected decomposition; and (iii) using results from steps (i)-(ii), calculating an estimate of the block matrix MTE to a desired order N using either a field-based expansion solution or a PSF/blurring-based expansion solution.

6. The method of claim 5, wherein in the applying step, the selected matrix decomposition is calculated by one or more of forward modelling using known model parameters and total up-going and down-going fields resulting from the redatuming step.

7. The method of claim 6, wherein the forward modelling uses a migration-velocity model.

8. The method of claim 5, wherein the inverse operator is estimated using a numerical approach selected from direct regularized least-squares inverse, iterative gradient-based optimization, and sparsity-promoting L1 minimization.

9. The method of claim 1, wherein the first target depth level is an original observation datum and the second target depth level is a datum selected to enclose a target volume away from the original observation datum.

10. The method of claim 9, wherein the retrieved TEEIs correspond only to properties of a medium within the target volume.

11. The method of claim 9, wherein the retrieved TEEIs are devoid of interference due to structures placed above or below the target volume.

\* \* \* \* \*